United States Patent [19]
Line

[11] Patent Number: 5,183,374
[45] Date of Patent: Feb. 2, 1993

[54] HORIZONTAL BROACH WITH A MOBILE STANDARD

[75] Inventor: Henri Line, Peymeinade, France

[73] Assignee: Helis, Peymeinade, France

[21] Appl. No.: 589,444

[22] Filed: Sep. 27, 1990

[30] Foreign Application Priority Data

Sep. 27, 1989 [FR] France .................. 89 12663

[51] Int. Cl.$^5$ ............................................. B23D 41/00
[52] U.S. Cl. ..................................... 409/286; 409/235
[58] Field of Search .................. 29/561, 564; 409/235, 409/241, 219, 243, 264, 280, 286; 408/234

[56] References Cited

U.S. PATENT DOCUMENTS

| | | | |
|---|---|---|---|
| 3,296,901 | 1/1967 | Sawada | 408/234 X |
| 3,800,636 | 4/1974 | Zagar | 408/234 X |
| 4,022,106 | 5/1977 | Kile | 409/235 |
| 4,510,668 | 4/1985 | Ishida et al. | 29/561 |
| 4,657,455 | 4/1987 | Rogers et al. | 409/235 |
| 4,706,373 | 11/1987 | Anderiussi | 409/219 |

FOREIGN PATENT DOCUMENTS

| | | |
|---|---|---|
| 0194173A3 | 2/1986 | European Pat. Off. . |
| 507690 | 9/1930 | Fed. Rep. of Germany . |
| 2521036 | 5/1975 | Fed. Rep. of Germany . |
| 2305262 | 3/1976 | France . |
| 2472960 | 1/1980 | France . |
| 6322 | 1/1985 | Japan ................................. 409/235 |
| 612610 | 3/1976 | Switzerland . |
| 1106081 | 3/1964 | United Kingdom . |

Primary Examiner—William Briggs
Attorney, Agent, or Firm—Sheridan Ross & McIntosh

[57] ABSTRACT

This invention relates to a machine-tool incorporating a mobile standard and a horizontal broach, wherein the mobile standard is disposed between a fixed lower base and a fixed upper base connected together by a rigid static support located behind the mobile standard, and is guided at each of its ends by parallel guiding means provided on said bases. The mobile standard is, moreover, driven at each of its ends by synchronized drive means.

7 Claims, 1 Drawing Sheet

HORIZONTAL BROACH WITH A MOBILE STANDARD

TECHNICAL FIELD OF THE INVENTION

The present invention relates to a machine-tool incorporating a mobile standard and a horizontal broach.

BACKGROUND OF THE INVENTION

All heretofore known machine-tools for milling, boring, and drilling that incorporate a mobile standard and a horizontal broach, present a mobile standard resting on a sole plate which slides on a fixed base, itself connected to a solid concrete mass. The broach is mobile vertically along the standard and may move horizontally along a perpendicular to the plane of displacement of the standard. These machines enable workpieces of very large dimensions, which remain fixed during the work, to be machined.

Such machines present two major drawbacks connected with their design. In the first place, they present a rigidity which varies with the vertical position of the broach, which means that they do not make it possible to carry out, under good conditions, either machining of blanks or finishing work when the broach is in a high position, due to the vibrations resulting from the lack of rigidity in the case of blanks and due to the deformations which are amplified as soon as the ratio of the height of the broach to the width of the slide rails increases in the case of finishing work. Secondly, the dimensioning of the standard necessary for obtaining a minimum rigidity results in the mobile assembly becoming very heavy, which means that these machines are relatively slow in their displacements and in their accelerations.

It is an object of the present invention to overcome these drawbacks and to propose a machine-tool incorporating a mobile standard and a horizontal broach, which allows perfect machinings both of blanks and for finishing, and which is rapid and precise.

SUMMARY OF THE INVENTION

The object is attained according to the invention in that the mobile standard is disposed between a lower base and an upper base connected together by a rigid static support located behind the mobile standard and is guided at each of its ends by parallel guiding means provided on said bases.

Thanks to this structure, the mobile standard is maintained and guided at each of its ends, which prevents any lateral displacement of the broach whatever its vertical position on the mobile standard. This considerably increases its rigidity for the same dimensions. It is therefore possible to lighten the mobile standard while maintaining a satisfactory rigidity thereof.

The mobile standard is preferably driven at each of its ends by synchronized drive means.

The mobile standard thus moves parallel to itself. As it is guided and driven at each end by very rigid devices and as it is lighter than the mobile standard of the prior art machine, it may move very rapidly and with considerable accelerations.

The rigid static support is advantageously made of reinforced concrete. It may also comprise an assembly of metal beams reinforced by a concrete filling.

The guiding means advantageously comprise a slide rail provided on the base.

The drive means are advantageously provided in the vicinity of the corresponding slide rail.

BRIEF DESCRIPTION OF THE DRAWINGS

The invention will be more readily understood on reading the following description with reference to the accompanying drawings, in which.

DETAILED DESCRIPTION OF THE DRAWINGS

Figure 1:
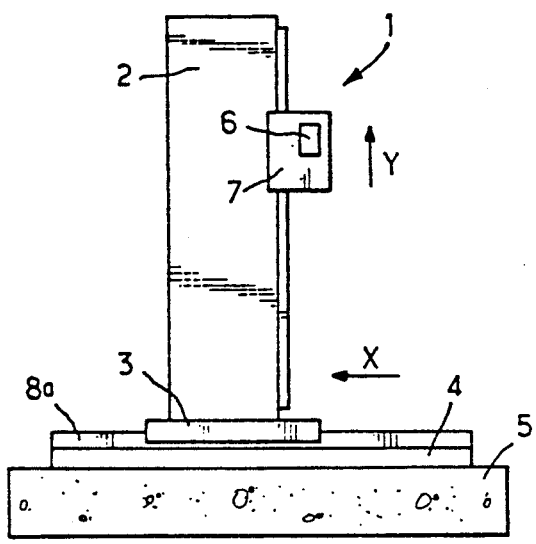
FIG. 1 shows a front view of the machine-tool with mobile standard and horizontal broach, of the prior art.
Figure 2:
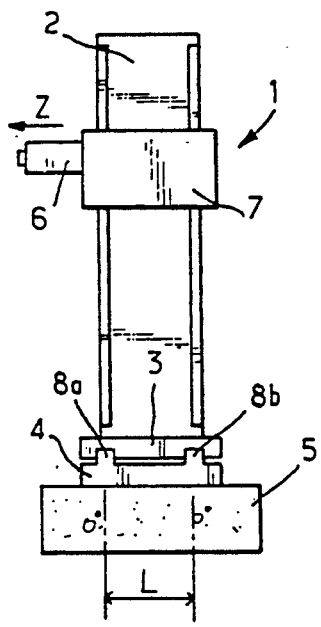
FIG. 2 shows a lateral view of the machine of FIG. 1.

Referring now to the drawings, FIGS. 1 and 2 show a prior-art machine-tool 1 incorporating a mobile standard and a horizontal broach.

This machine-tool 1 comprises a mobile standard 2 resting on a sole plate 3 which slides on a fixed base 4 itself rigidly connected to a solid concrete mass 5. A broach 6, borne by a broach support 7 which is vertically mobile along the mobile standard 2, may move horizontally and perpendicularly to the vertical plane in which the mobile standard 2 may move. The sole plate 3 is guided on the fixed base 4 with the aid of two parallel slide rails 8a and 8b distant by a length L. These slide rails 8a and 8b support and guide the mobile standard 2.

This machine makes it possible to machine workpieces of large dimensions disposed in the vicinity of the machine 1 and which remain fixed during the work, and it is provided with motors actuated by a control member (not shown in the drawing) allowing the horizontal displacement of the fixed standard 2 along axis X, the vertical displacement of the broach support 7 along axis Y and the horizontal displacement of the broach 6 along axis Z perpendicular to the plane defined by axes X and Y, as a function of the plane of machining of the workpiece.

Figure 3:
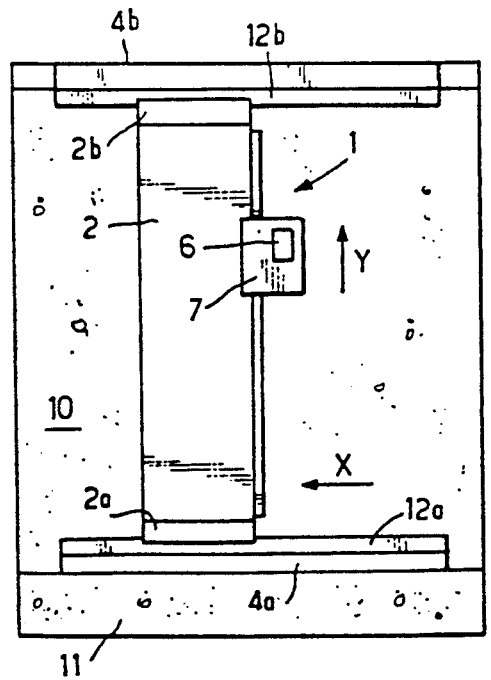
FIG. 3 is a front view of the machine-tool according to the invention.
Figure 4:
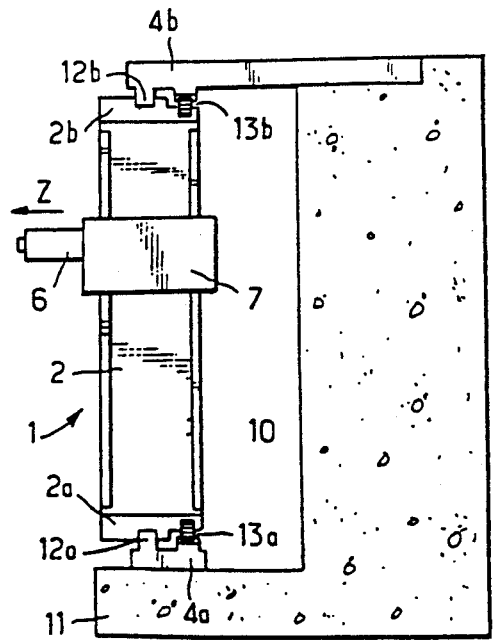
FIG. 4 is a side view of the machine-tool of FIG. 3.

FIGS. 3 and 4 show a machine-tool 1 incorporating a mobile standard and a horizontal broach according to the invention. The elements of this machine, identical to the elements of the machine of the prior art, bear the same references.

As is clearly seen in the drawings, the mobile standard 2 on which is mounted a broach support 7 vertically mobile along axis Y and bearing the broach 6 horizontally mobile along axis Z, is disposed between a fixed lower base 4a and a fixed upper base 4b parallel to the fixed base 4a. The lower base 4a is located below the lower end 2a of the mobile standard 2 and the upper base 4b is located above the upper end 2b of the mobile standard 2.

The upper base 4b extends rearwardly of the mobile standard 2, on the side opposite the broach 6 and it is rigidly connected to a vertical, rigid, static support 10 disposed to the rear of the mobile standard 2. The static support 10 is extended in its lower part by a horizontal block 11 which extends forwardly of the mobile standard 2 and on which the lower base 4a is fixed.

The lower base 4a comprises a longitudinal slide rail 12a cooperating with the lower end 2a of the mobile standard 2, and the upper base 4b also comprises a longitudinal slide rail 12b parallel to the slide rail 12a and cooperating with the upper end 2b of the mobile standard 2. The lower slide rail 12a thus supports the mobile standard 2 and the two slide rails 12a and 12b make it possible to guide the mobile standard 2 during its displacement along axis X and to maintain it transversely. The two slide rails 12a and 12b, distant from each other, constitute the means for guiding the mobile standard 2.

The mobile standard 2 is displaced along axis X parallel to the slide rails 12a and 12b by drive means actuated by the control member (not shown in the drawings).

The mobile standard 2 is preferably driven at each of its ends 2a and 2b by synchronized drive devices 13a and 13b placed respectively near the lower guide means and the upper guide means. Each drive device is constituted in manner known per se either by a screw or by box and rack.

The two drive devices 13a and 13b may be synchronized either mechanically or electrically. Thanks to its double drive, the mobile standard 2 moves along axis X, remaining parallel to itself.

The machine-tool 1 further comprises motors for actuating the drive devices 13a and 13b in order to displace the broach support 7 vertically, and to displace the broach 6 horizontally, these motors being controlled by a control member as a function of a machining program.

The static support 10 rigidly connecting the lower base 4a and the upper base 4b is designed so that it is very rigid, so as to avoid vibrations and to maintain the mobile standard 2 in the vertical plane defined by axes X and Y whatever the vertical position of the broach.

The static support 10 extends laterally over the whole length of the bases 4a and 4b and it may be constituted by reinforced concrete, like a foundation block. In that case, the machine-tool 1 cannot be displaced.

It may also be made with at least one standard of special concrete independent of the foundation block, or by an assembly of metal beams reinforced by a concrete filling.

What is claimed is:

1. A machine-tool, comprising:

a lower base having a substantially horizontal lower means for guiding;

an upper base having an upper means for guiding substantially parallel to said lower means for guiding;

a rigid static support for interconnecting said lower base to said upper base;

a vertical mobile standard having a lower end cooperating with said lower means for guiding and an upper end cooperating with said upper means for guiding, said mobile standard being positioned between said lower base and said upper base;

a broach support mounted on said mobile standard;

a horizontal broach borne by said broach support; and synchronized drive means cooperating with said mobile standard for driving said mobile standard at each of its ends with respect to said lower and upper bases.

2. The machine-tool of claim 1, wherein the rigid static support comprises reinforced concrete and constitutes the foundation block of the machine.

3. The machine-tool of claim 1, wherein the rigid static support includes at least one standard made of special concrete independent of the foundation block.

4. The machine-tool of claim 1, wherein the rigid static support includes an assembly of concrete filled metal beams.

5. The machine-tool of claim 1, wherein said guiding means comprises at least one slide rail provided on each base.

6. The machine-tool of claim 5, wherein said drive means for driving the mobile standard at each of its ends is provided in the vicinity of the corresponding slide rail.

7. The machine-tool of claim 1, wherein the rigid static support extends over an entire length of the bases.

* * * * *